(12) United States Patent
Uebayashi et al.

(10) Patent No.: US 9,079,381 B2
(45) Date of Patent: Jul. 14, 2015

(54) GAS BARRIER FILM

(75) Inventors: Hiroyuki Uebayashi, Otsu (JP); Takashi Arai, Otsu (JP); Kusato Hirota, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 463 days.

(21) Appl. No.: 13/121,721

(22) PCT Filed: Sep. 30, 2009

(86) PCT No.: PCT/JP2009/066994
§ 371 (c)(1),
(2), (4) Date: Jun. 10, 2011

(87) PCT Pub. No.: WO2010/038755
PCT Pub. Date: Apr. 8, 2010

(65) Prior Publication Data
US 2011/0236706 A1 Sep. 29, 2011

(30) Foreign Application Priority Data
Oct. 1, 2008 (JP) .................................. 2008-256017

(51) Int. Cl.
| | |
|---|---|
| *B32B 15/08* | (2006.01) |
| *B32B 15/082* | (2006.01) |
| *B32B 27/30* | (2006.01) |
| *B32B 27/36* | (2006.01) |
| *C08K 5/16* | (2006.01) |
| *C08K 5/54* | (2006.01) |
| *C08L 33/04* | (2006.01) |
| *C08L 33/06* | (2006.01) |
| *C08L 33/12* | (2006.01) |
| *C08L 33/18* | (2006.01) |
| *C08L 33/20* | (2006.01) |
| *C09D 133/04* | (2006.01) |
| *C09D 133/06* | (2006.01) |
| *C09D 133/12* | (2006.01) |
| *C09D 133/18* | (2006.01) |
| *C09D 133/20* | (2006.01) |
| *B32B 27/08* | (2006.01) |
| *B32B 7/12* | (2006.01) |
| *B32B 27/32* | (2006.01) |
| *C08J 7/04* | (2006.01) |
| *C08K 5/00* | (2006.01) |
| *C08K 5/10* | (2006.01) |
| *C08K 5/29* | (2006.01) |

(52) U.S. Cl.
CPC . *B32B 27/08* (2013.01); *B32B 7/12* (2013.01); *B32B 27/32* (2013.01); *B32B 27/36* (2013.01); *C08J 7/045* (2013.01); *B32B 15/08* (2013.01); *B32B 15/082* (2013.01); *B32B 27/30* (2013.01); *B32B 27/308* (2013.01); *B32B 2250/03* (2013.01); *B32B 2250/24* (2013.01); *B32B 2255/10* (2013.01); *B32B 2255/20* (2013.01); *B32B 2255/205* (2013.01); *B32B 2255/26* (2013.01); *B32B 2255/28* (2013.01); *B32B 2307/7242* (2013.01); *B32B 2307/7244* (2013.01); *B32B 2307/7246* (2013.01); *B32B 2439/00* (2013.01); *B32B 2553/00* (2013.01); *C08J 2333/20* (2013.01); *C08K 5/0025* (2013.01); *C08K 5/10* (2013.01); *C08K 5/16* (2013.01); *C08K 5/29* (2013.01); *C08K 5/54* (2013.01); *C08L 33/04* (2013.01); *C08L 33/06* (2013.01); *C08L 33/066* (2013.01); *C08L 33/12* (2013.01); *C08L 33/18* (2013.01); *C08L 33/20* (2013.01); *C08L 2201/14* (2013.01); *C09D 133/04* (2013.01); *C09D 133/06* (2013.01); *C09D 133/066* (2013.01); *C09D 133/12* (2013.01); *C09D 133/18* (2013.01); *C09D 133/20* (2013.01); *Y10T 428/1334* (2015.01); *Y10T 428/1338* (2015.01); *Y10T 428/1341* (2015.01); *Y10T 428/1352* (2015.01); *Y10T 428/1355* (2015.01); *Y10T 428/1379* (2015.01); *Y10T 428/1383* (2015.01)

(58) Field of Classification Search
None
See application file for complete search history.

(56) References Cited

U.S. PATENT DOCUMENTS

| | | | | | |
|---|---|---|---|---|---|
| 3,914,463 | A | * | 10/1975 | Mercurio et al. | 427/385.5 |
| 4,292,228 | A | * | 9/1981 | Isley | 524/112 |
| 4,299,942 | A | * | 11/1981 | Piestert et al. | 526/323.1 |
| 4,370,368 | A | * | 1/1983 | Hirata et al. | 428/36.6 |

(Continued)

FOREIGN PATENT DOCUMENTS

| | | | |
|---|---|---|---|
| EP | 1 935 910 | * | 6/2008 |
| JP | 56-014565 | * | 2/1981 |

(Continued)

OTHER PUBLICATIONS

International Search Report dated Jan. 12, 2010, application No. PCT/JP2009/066994.

*Primary Examiner* — Vivian Chen
(74) *Attorney, Agent, or Firm* — RatnerPrestia

(57) ABSTRACT

A gas barrier film is provided comprising a base film of polyester provided, on at least one of its surfaces, with a deposited layer of an inorganic compound and a gas barrier layer of a copolymer resin composition formed on the former. The gas barrier layer is produced from a mixture of a base material composed at least of the two components of (a) an unsaturated nitrile that accounts for 10% to 30% by mass of the copolymer and (b) an unsaturated compound with a hydroxyl group that accounts for 30% to 70% by mass of the copolymer; (c) a curing agent that contains a compound with an isocyanate group; and (d) a compound that has either two or more carboxylic acid groups or one or more carboxylic anhydride groups.

10 Claims, No Drawings

(56) References Cited

U.S. PATENT DOCUMENTS

| | | | |
|---|---|---|---|
| 4,390,652 A * | 6/1983 | Isley | 524/322 |
| 4,439,495 A * | 3/1984 | Tobias | 428/463 |
| 4,654,398 A * | 3/1987 | McFadden | 524/512 |
| 5,114,795 A * | 5/1992 | Percec et al. | 428/516 |
| 5,279,783 A * | 1/1994 | Liu et al. | 264/178 F |
| 5,487,940 A * | 1/1996 | Bianchini et al. | 428/349 |
| 5,589,252 A * | 12/1996 | Matsuo et al. | 428/216 |
| 5,770,301 A * | 6/1998 | Murai et al. | 428/213 |
| 6,004,660 A * | 12/1999 | Topolski et al. | 428/212 |
| 6,214,422 B1 * | 4/2001 | Yializis | 427/488 |
| 6,447,845 B1 * | 9/2002 | Nanavati et al. | 427/383.5 |
| 6,605,344 B1 * | 8/2003 | Ohba et al. | 428/332 |
| 6,720,052 B1 * | 4/2004 | Rule et al. | 428/36.7 |
| 6,740,378 B1 * | 5/2004 | Rule et al. | 428/35.9 |
| 7,022,388 B2 * | 4/2006 | Hashimoto et al. | 428/34.9 |
| 7,078,453 B1 * | 7/2006 | Feeney et al. | 524/493 |
| 7,279,061 B2 * | 10/2007 | Francois | 156/237 |
| 7,303,797 B1 * | 12/2007 | Barsotti et al. | 428/36.7 |
| 7,378,157 B2 * | 5/2008 | Sakakura et al. | 428/451 |
| 7,473,729 B2 * | 1/2009 | Feeney et al. | 524/445 |
| 7,615,287 B2 * | 11/2009 | Okawara et al. | 428/451 |
| 7,649,045 B2 * | 1/2010 | Karpowicz et al. | 524/515 |
| 8,124,236 B2 * | 2/2012 | Okawara et al. | 428/425.5 |
| 2008/0070043 A1 * | 3/2008 | Arai et al. | 428/425.8 |
| 2012/0288708 A1 * | 11/2012 | Arai et al. | 428/341 |

FOREIGN PATENT DOCUMENTS

| | | | |
|---|---|---|---|
| JP | 2000-177074 A | | 6/2000 |
| JP | 2000-273318 | * | 10/2000 |
| JP | 2002-166507 | * | 6/2002 |
| JP | 2005-162892 | * | 6/2005 |
| JP | 2005-162892 A | | 6/2005 |
| JP | 2006-224577 A | | 8/2006 |
| JP | 2008-056835 | * | 3/2008 |
| WO | WO 2008/120600 | * | 10/2008 |

* cited by examiner

GAS BARRIER FILM

CROSS-REFERENCE TO RELATED APPLICATIONS

This application is the U.S. National Phase application of PCT International Application No. PCT/JP2009/066994, filed Sep. 30, 2009, and claims priority of Japanese Patent Application No. 2008-256017, filed Oct. 1, 2008, the disclosures of such applications being incorporated herein by reference in their entirety for all purposes.

FIELD OF THE INVENTION

The invention relates to a gas barrier film having a high barrier function against oxygen and vapor and a high resistance against heat sterilization processes such as boiling and retorting.

BACKGROUND OF THE INVENTION

Various gas barrier films and packaging materials produced from them have already been known. The best gas barrier material is aluminum foil. However, aluminum foil easily suffers pinholes when used singly, and can serve only for special purposes. Consequently, aluminum film is used only as an interlayer in laminate films in most cases. Aluminum-containing laminate films have very good gas barrier properties. However, such laminate films are opaque, and the contents of a bag made of such a laminate film cannot be seen through it. There are other disadvantages including the difficulty in determining whether the bag has been heat-sealed completely and unsuitability as packaging material for foods to be cooked in a microwave oven.

Thermoplastic films such as polyester film and polyamide film are high in strength, transparency, and moldability, and have been used widely as packaging material. These thermoplastic resin films, however, are high in permeability to gases such as oxygen and vapor. If used as packaging material for general, boiled, and retort-pouch foods, therefore, the contents can undergo deterioration and degradation as they are stored for a long time.

As a solution to this problem, films of polyolefin, nylon, polyethylene terephthalate (hereinafter abbreviated as PET), and the like, coated with an emulsion of vinylidene chloride (hereinafter abbreviated as PVDC) and the like have been used conventionally as packaging material required to have gas barrier properties such as for foods. Films with a PVDC layer formed by coating have a high barrier function against oxygen not only at low humidity but also at high humidity, and also have good barrier properties against vapor. If PVDC-coated films are incinerated for disposal, however, chlorine gas can be generated from the chlorine contained in the PVDC, and in addition, dioxins can also be produced. Thus, PVDC-coated films can have serious adverse influence on environment and human health, and development of alternative materials has been strongly called for.

The most widely known chlorine-free gas barrier materials include polyvinyl alcohol (hereinafter abbreviated as PVA) film and films coated with PVA or an ethylene-vinyl alcohol copolymer (hereinafter abbreviated as EVOH). PVA and EVOH show very good barrier properties against oxygen gas in a dry environment. These materials, however, have problems as follows: (1) their barrier properties depend largely on humidity and the barrier properties deteriorate seriously under high-humidity conditions, (2) they do not have a barrier function against vapor, (3) they can be easily dissolved in hot water, and (4) they suffer large deterioration in gas barrier properties caused by water absorbed during the boiling and retorting process.

There is a proposal of vapor-deposited films that have a vapor-deposited film of an inorganic oxide such as, for instance, aluminum oxide and silicon oxide formed by physical vapor deposition such as vacuum deposition on one of the surfaces of a thermoplastic film such as polyester film. These gas barrier films with a thin deposited inorganic oxide layer have the advantages of being transparent to make the contents visible and suitable for cooking in a microwave oven. The gas barrier layer is generally stiff, however, in the case of films having a deposited inorganic oxide layer as gas barrier layer. Consequently, they have the disadvantage of suffering a serious deterioration in gas barrier properties as a result of cracks and pinholes produced in the gas barrier layer when bent.

To solve this problem, there are generally known techniques that improve gas barrier properties and flexibility by providing a thermoplastic resin film with a deposited inorganic oxide layer, followed by further coating the deposited layer with a polymer to form a gas barrier layer (for instance, Patent documents 1 to 3).

Patent document 1: Japanese Unexamined Patent Publication (Kokai) No. 2004-35833

Patent document 2: Japanese Unexamined Patent Publication (Kokai) No. 2002-307600

Patent document 3: Japanese Unexamined Patent Publication (Kokai) No. HEI-9-327882

The technique described in Patent document 1 is designed to provide a polyester base film with a gas barrier layer by crosslinking the polymer through ester bonds in order to improve the barrier properties at high humidity. To allow the esterification to proceed sufficiently to improve the gas barrier properties of the film, the film should be heated to cause the reaction at a high temperature. Undesirably, this leads to a decrease in productivity.

Patent document 2 describes a technique that provides a base film of polyester, polypropylene, and the like with a thin inorganic oxide film, and forms, on top of it, a transparent coated layer composed of a thermosetting epoxy resin and an organic curing agent. When undergoing hot-water sterilization such as boiling and retorting, however, a film of this layered structure suffers a large deterioration in the contact between the inorganic oxide layer and the transparent coated layer. Specifically, when used as packaging material for foods, this film can suffer practical problems such as delamination (interlayer peeling) of the surface film when subjected to hot water sterilization such as boiling and retorting.

In addition, the technique described in Patent document 3 forms a primer layer formed with a primer agent between a base film and a deposited inorganic oxide layer. Films of such a layered structure can develop a strong contact between a deposited inorganic oxide layer and a gas barrier layer when subjected to hot water sterilization such as boiling and retorting. However, they require an increased number of production steps, leading to the problem of increased production costs.

The present invention was made in view of the above problems, and aims to provide a gas barrier film that does not cause environmental contamination with halogens, have good barrier properties against gases such as oxygen and vapor, and resist hot water sterilization such as boiling and retorting.

SUMMARY OF THE INVENTION

The present invention provides:
(1) A gas barrier film comprising a base film of polyester provided, on at least one of its surfaces, with a deposited layer of an inorganic compound and a gas barrier layer of a copolymer resin composition formed on the former,
wherein said gas barrier layer is produced from a mixture of a base material composed of an unsaturated nitrile (a) that accounts for 10 to 30 parts by mass in 100 parts by mass of the copolymer and an unsaturated compound (b) with a hydroxyl group that accounts for 30 to 70 parts by mass in 100 parts by mass of the copolymer, the total of said unsaturated nitrile (a) and said unsaturated compound (b) accounting for 20 parts or more by mass in 100 parts by mass of the entire copolymer resin of said gas barrier layer; a curing agent (c) that contains a compound with an isocyanate group; and a compound (d1) that has either two or more carboxylic acid groups or one or more carboxylic anhydride groups.
(2) A gas barrier film as described in paragraph (1) wherein said unsaturated nitrile (a) is acrylonitrile.
(3) A gas barrier film as described in either paragraph (1) or (2) wherein said unsaturated compound (b) with a hydroxyl group is 2-hydroxyethyl methacrylate.
(4) A gas barrier film as described in any of paragraphs (1) to (3) wherein said curing agent (c) containing a compound with an isocyanate group is an isocyanate with a backbone structure as represented by the following structural formula (1) and/or structural formula (2).

[Chemical compound 1]

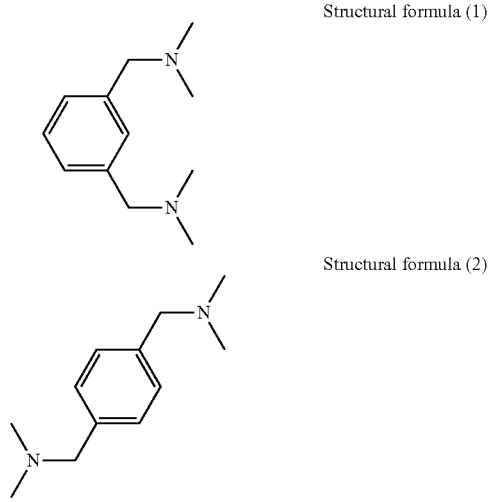

Structural formula (1)

Structural formula (2)

(5) A gas barrier film as described in any of paragraphs (1) to (4) wherein said compound (d1) with either two or more carboxylic acid groups or one or more carboxylic anhydride groups is tetrabasic anhydride.
(6) A gas barrier film as described in any of paragraphs (1) to (5) wherein said base material constituting said gas barrier layer contains, as monomers, one or more unsaturated compounds (e) selected from the group of unsaturated carboxylate, styrene, unsaturated carboxylic acid, unsaturated hydrocarbon, and vinyl ester that account for 3 to 60 parts by mass in 100 parts by mass of the copolymer.
(7) A gas barrier film as described in any of paragraphs (1) to (6) wherein said gas barrier layer contains a silane coupling agent (d2).
(8) A gas barrier film as described in paragraph (7) wherein said silane coupling agent (d2) contains at least one hydroxyl group.
(9) A gas barrier film as described in paragraph (7) wherein said silane coupling agent (d2) has one or more functional groups selected from the group of amino, vinyl, and epoxy.
(10) A gas barrier film as described in paragraphs (6) wherein said unsaturated compound (e) is methyl methacrylate.
(11) A packaging material for retort pouches comprising a gas barrier film as described in any of paragraphs (1) to (9).

The invention provides gas barrier films that can not only have good oxygen barrier properties and vapor barrier properties but also have resistance against hot water sterilization such as boiling and retorting. At the same time, the gas barrier films according to embodiments of the invention are free from halogens such as chlorine. Furthermore, the gas barrier films according to embodiments of the invention do not require heat treatment at high temperatures for the production of the gas barrier layers. As a result, it is possible to provide gas barrier films with the good features that they can be produced at low costs and require no complicated production steps to ensure high production suitability. Specifically, the invention provides gas barrier films that serve for a wide variety of uses including food packaging films that require gas barrier properties and undergo boiling and retorting processes.

DETAILED DESCRIPTION OF THE INVENTION

The invention is described in detail below with reference to exemplary embodiments.
(1) The gas barrier film according to embodiments of the invention comprises a base film of polyester provided, on at least one of its surfaces, with a deposited layer of an inorganic compound and a gas barrier layer of a copolymer resin composition formed on the former,
wherein said gas barrier layer is produced from a mixture of a base material composed of an unsaturated nitrile (a) that accounts for 10 to 30 parts by mass in 100 parts by mass of the copolymer and an unsaturated compound (b) with a hydroxyl group that accounts for 30 to 70 parts by mass in 100 parts by mass of the copolymer, the total of said unsaturated nitrile (a) and said unsaturated compound (b) with a hydroxyl group accounting for 20 or more parts by mass in 100 parts by mass of the entire copolymer resin; a curing agent (c) that contains a compound with an isocyanate group; and a compound (d1) that has either two or more carboxylic acid groups or one or more carboxylic anhydride groups.
It is more preferable that silane coupling agent (d2) containing at least one hydroxyl group is added to the gas barrier film. In order to ensure a strong contact during hot water sterilization, it is preferable that said silane coupling agent has one or more functional groups selected from the group of amino, vinyl, and epoxy.

The deposited layer of an inorganic compound formed on the base film has gas barrier properties, but has defects such as pinholes and cracks. The gas barrier properties, therefore, cannot work sufficiently in many cases. According to embodiments of the invention, a gas barrier layer is formed on top of the deposited layer of an inorganic compound. This gas barrier layer compensates for the lack in gas barrier capability of the deposited layer, and in addition, gas barrier properties of the resin that constitutes the gas barrier layer function effectively. The invention preferably uses a compound (d1) that contains either two or more carboxylic acid groups or one or more carboxylic acid anhydride groups, which works to bring the deposited layer and the gas barrier layer come in a strong contact that resists hot water sterilization such as boiling or retort pouch. As a result, gas barrier properties as well as the contact between the deposited layer and the gas barrier layer improve largely.

Most resins with gas barrier properties contain a polar group to enhance coagulation of the polymer. Consequently, they frequently have water absorption properties, making it difficult to develop resistance to hot water sterilization. For exemplary embodiments of the invention, a gas barrier layer is formed from a resin composition of specific components to develop resistance to hot water sterilization. This serves to solve the problem of water absorption.

Thus, the resin to be used to form the gas barrier layer is synthesized from two or more monomers that can develop a specific function, thereby developing gas barrier properties and resistance to hot water sterilization. Specifically, for exemplary embodiments of the invention, monomers to develop gas barrier properties and monomers to develop a strong contact with the deposited inorganic oxide layer and resistance to hot water are copolymerized to meet the above requirement. With respect to the contact, a compound (d1) with either two or more carboxylic acid groups or one or more carboxylic acid anhydride groups are added to further enhance the contact strength.

Base Film

In the gas barrier film of the invention, the base film is preferably a polyester film. The useful polyesters include, for instance, homo- or co-polyalkylene arylates such as polyalkylene terephthalate (polyethylene terephthalate, polybutylene terephthalate, and the like), polyalkylene naphthalate (polyethylene-2,6-naphthalate, and the like), and liquid crystalline polyesters.

The base film may be an unstretched film, but commonly it is a stretched (uniaxial or biaxial) film. With respect to the stretched film, a biaxially stretched film is used in most cases. With respect to the stretching method, a common stretching method can be used such as, for instance, rolling, calendering, belt stretching, tenter stretching, and tube stretching, which may be combined.

There are no specific limitations on the thickness of the base film, but practically, it is 1 to 100 μm, preferably 5 to 50 μm, and more preferably 10 to 30 μm.

Deposited Layer

For the invention, a deposited layer of an inorganic compound is preferably used. The useful inorganic compounds include metal oxides and metal nitrides. The useful metal oxides include aluminum oxide, magnesium oxide, titanium oxide, oxidized tin, indium oxide alloy, silicon oxide, silicon oxynitride, and mixed oxides thereof, and the useful metal nitrides include aluminum nitride, titanium nitride, and silicon nitride. Of these, said inorganic compound is preferably aluminum oxide, silicon oxide, or silicon oxynitride from the viewpoint of factors such as processing costs and gas barrier properties of the deposited film.

There are no specific limitations on the method used for the deposition of an inorganic compound, and generally known method such as, for instance, deposition and sputtering can be used.

Gas Barrier Layer

For the invention, said gas barrier layer is preferably produced from a mixture of a base material composed of an unsaturated nitrile (a) that accounts for 10 to 30 parts by mass in 100 parts by mass of the copolymer and an unsaturated compound (b) with a hydroxyl group that accounts for 30 to 70 parts by mass in 100 parts by mass of the copolymer, the total of said unsaturated nitrile (a) and said unsaturated compound (b) with a hydroxyl group accounting for 20 or more parts by mass in 100 parts by mass of the entire copolymer resin; a curing agent (c) that contains a compound with an isocyanate group; and a compound (d1) that has either two or more carboxylic acid groups or one or more carboxylic anhydride groups.

It is preferable that said base resin is formed of a copolymer that is produced from at least three monomers as follows: an unsaturated nitrile (a), an unsaturated compound (b) with a hydroxyl group, and one or more unsaturated compounds (e) selected from the group of unsaturated carboxylate, styrene, unsaturated carboxylic acid, unsaturated hydrocarbon, and vinyl ester.

It is more preferable that a silane coupling agent (d2) containing at least one hydroxyl group is add to the gas barrier layer. The silane coupling agent (d2) to be used preferably contains one or more functional groups selected from the group of amino, vinyl, and epoxy in the viewpoint of development of a contact resistant to hot water sterilization.

The factors that determine the gas barrier properties of the thin film layer made of resin include coagulation energy density, free volume, degree of crystallinity, and degree of orientation. These factors are largely attributable to the side chain functional groups in the polymer structure. Polymer chains containing, in their structures, functional groups that develop intermolecular interactions such as hydrogen bonds and electrostatic interactions tend to coagulate strongly, with the interactions working as driving force. This will results in an increase in the coagulation energy density, increase in the degree of orientation, decrease in the free volume, and improvement in the gas barrier properties. If the polymer structure contains three-dimensionally bulky functional groups, on the other hand, they are likely to hinder the coagulation of polymer molecules and increase the free volume, leading to deterioration in gas barrier properties. It is considered, furthermore, that as the number and intensity of the intermolecular interactions formed increases, their driving force to increase the coagulation and decrease the free volume will be enhanced, leading to an increase in the coagulation density of the polymer.

Base Resin: Unsaturated Nitrile (a)

It is preferable that the unsaturated nitrile (a) to be used as the base resin is acrylonitrile. Acrylonitrile has a nitrile group in its molecular structure, and the nitrile group is a strongly polarized functional group that has a strong tendency to form hydrogen bonds. Consequently, a layer of a copolymer containing acrylonitrile as a constitute component can develop gas barrier properties as a result of a large contribution from the nitrile group in acrylonitrile. The intensity of the gas barrier properties to be developed depends on the content of acrylonitrile.

The unsaturated nitrile blended accounts for 10 to 30 parts by mass, preferably 10 to 25 parts by mass in 100 parts by mass of the copolymer. If the content of the unsaturated nitrile (a) is more than 30 parts by mass, the copolymer resin will less soluble in organic solvents to prevent the growth of the polymer up to a high molecular weight during polymerization, making it difficult to produce a good coating from it. Furthermore, the polymer will be less practical because it will not be able to form a good coat layer and will be less transparent. If the content is less than 10 parts by mass, on the other hand, the gas barrier properties of the gas barrier layer will not be improved sufficiently.

Base Resin: Unsaturated Compound (b) with a Hydroxyl Group

As described above, the content of the unsaturated nitrile (a) in the copolymer should preferably be high from the viewpoint of improvement in gas barrier properties. However, polyacrylonitrile, which is used as said unsaturated nitrile (a), has a particularly high glass transition temperature of about 300° C., and has to be heated up to a high temperature for film formation, though the film formation temperature should preferably be lower in view of the melting point of the base film. The factors that determine the gas barrier properties include coagulation energy density, free volume, degree of crystallinity, degree of orientation, as described above, but the use of a monomer with a highly polarized functional group as a component of the copolymer is also an effective means of improving the gas barrier properties. From this viewpoint, as the hydroxyl group can work as a functional group with large cohesive force, the invention preferably uses an unsaturated compound (b) with a hydroxyl group. If an unsaturated compound (b) with a hydroxyl group is added to the gas barrier layer, it forms a crosslinked structure with the curing agent and adheres strongly to the deposited inorganic oxide layer, making it possible to produce a strong coat layer and develop resistance to hot water treatment.

Such unsaturated compounds (b) with a hydroxyl group include, for instance, unsaturated monomer compounds such as 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, 2-hydroxyvinyl ether, polyethylene glycol methacrylate, polypropylene glycol monoacrylate, and polypropylene glycol monomethacrylate. These unsaturated compounds (b) with a hydroxyl group may be used singly or as a mixture thereof. Of these unsaturated compounds with a hydroxyl group, 2-hydroxyethyl acrylate and 2-hydroxyethyl methacrylate are preferable because a high polymerization stability and a high reactivity with the isocyanate group are achieved, of which 2-hydroxyethyl methacrylate is particularly preferable.

Depending on the content of the unsaturated compound (b) with a hydroxyl group in the copolymer, the film formation properties and gas barrier properties of the gas barrier layer, as well as the number of crosslinks with the curing agent vary to cause changes in the heat resistance and coat film hardness. From this viewpoint, the unsaturated compound (b) with a hydroxyl group accounts for 30 to 70 parts by mass, preferably 50 to 70 parts by mass, in 100 parts by mass of the copolymer. If the content of the unsaturated compound (b) with a hydroxyl group is less than 30 parts by mass, coagulation of resin chains attributable to the hydroxyl group may not develop sufficiently, failing to improve the gas barrier properties. The crosslinking reaction between the hydroxyl group and the curing agent may not progress sufficiently to produce a required number of crosslinks, failing to allow the gas barrier layer to have sufficient heat resistance or resistance to hot water sterilization. If the content of the unsaturated compound (b) with a hydroxyl group is more than 70 parts by mass, on the other hand, an increased number of hydroxyl groups will exist in the copolymer resin, and the content of the curing agent will have to be increased, possibly leaving many isocyanate groups unreacted in the curing agent and causing problems such as blocking. In addition, the contents of said component (a) and the component (c) described later will decrease, possibly leading to smaller improvement in the gas barrier properties or deterioration in coat film formation.

With respect to the mass ratio between the unsaturated nitrile (a) and the unsaturated compound (b) with a hydroxyl group in the copolymer, it is preferable that the (a):(b) ratio is 10:70 to 30:30, more preferably 20:50 to 30:50.

Base Resin: One or More Unsaturated Compounds (e) Selected from the Group of Unsaturated Carboxylate, Styrene, Unsaturated Carboxylic Acid, Unsaturated Hydrocarbon, and Vinyl Ester With respect to said one or more unsaturated compounds (e) selected from the group of unsaturated carboxylate, styrene, unsaturated carboxylic acid, unsaturated hydrocarbon, and vinyl ester to be used preferably in the base resin for the invention, said unsaturated carboxylate may be methyl methacrylate, methyl acrylate, ethyl acrylate, ethyl methacrylate, n-propyl acrylate, n-propyl methacrylate, isopropyl acrylate, isopropyl methacrylate, n-butyl acrylate, n-butyl methacrylate, isobutyl acrylate, isobutyl methacrylate, t-butyl acrylate, t-butyl methacrylate, 2-ethylhexyl acrylate, 2-ethylhexyl methacrylate, or the like.

Said unsaturated carboxylic acid may be acrylic acid, methacrylic acid, maleic acid, itaconate, crotonic acid, fumaric acid, or the like.

Other useful monomers include styrene, α-methyl styrene, butadiene, ethylene, and vinyl acetate.

Of these, unsaturated carboxylates are preferable. Of the unsaturated carboxylates, methyl methacrylate and methyl acrylate are particularly preferable, and methyl methacrylate is still more preferable.

The content of the component (e) is preferably 3 to 60 parts by mass, more preferably 5 to 40 parts by mass 100 parts by mass of the copolymer. If the content of the component (e) is more than 60 parts by mass, the relative quantities of the unsaturated nitrile (a) and the unsaturated compound (b) with a hydroxyl group in the copolymer resin will decrease, possibly failing to develop gas barrier properties sufficiently or leading to insufficient coat film strength or resistance to hot water treatment due to a lack of crosslinks.

With respect to the ratio among said unsaturated nitrile (a), said unsaturated compound (b) with a hydroxyl group, and said one or more unsaturated compounds (e) selected from the group of unsaturated carboxylate, styrene, unsaturated carboxylic acid, unsaturated hydrocarbon, and vinyl ester, in the copolymer, the ratio of (a)+(b):(e) is preferably 40:60 to 97:3. The ratio of (a)+(b):(e) is more preferably 60:40 to 80:20.

Other Additives

The gas barrier layer relating to the invention may contain a thermal stabilizer, antioxidant, toughening agent, pigment, antidegradant, weathering agent, flame retardant, plasticizer, mold releasing agent, lubricant, and the like, as long as they impair its characteristics.

Usable thermal stabilizers, antioxidants and antidegradants include, for instance, hindered phenols, phosphorus compounds, hindered amines, sulfur compounds, copper compounds, halogenated alkali metals, and mixtures thereof.

Usable toughening agents include, for instance, clay, talc, calcium carbonate, zinc carbonate, wollastonite, silica, alumina, magnesium oxide, calcium silicate, sodium aluminate, sodium aluminosilicate, magnesium silicate, glass balloon, carbon black, zinc oxide, zeolite, hydrotalcite, metal fiber, metal whisker, ceramic whisker, potassium titanate whisker, boron nitride, graphite, glass fiber, and carbon fiber.

The gas barrier layer for the invention may contain an inorganic layer compound. Preferable inorganic layer compounds include montmorillonite, beidellite, saponite, hectorite, sauconite, vermiculite, fluorine mica, muscovite, palagonite, phlogopile, biotite, lepidolite, margarite, clintonite, and anandite, of which swellable fluorine mica and montmorillonite are particularly preferable. These inorganic layer compounds include natural, artificially synthesized or modified ones, which may be treated with an organic substance such as an onium salt.

Curing Agent (c) Composed Mainly of a Compound with an Isocyanate Group

For the invention, a curing agent composed mainly of a compound with an isocyanate group is preferably used to form crosslinks with the copolymeric base resin. If applied singly, the copolymer resin used as the base resin may not develop properties such as coat film strength and hot water treatment resistance, though gas barrier properties can develop. So, a compound having an isocyanate group that can react with the hydroxyl group contained in the side chain of the copolymer resin, i.e. the base resin, is used as curing agent. The addition of a crosslinking agent serves to produce a crosslinked structure, leading to the formation of a gas barrier layer that has properties such as gas barrier properties, high coat film strength, and resistance to hot water treatment. Such compounds with an isocyanate group include aromatic diisocyanate, araliphatic diisocyanate, alicyclic diisocyanate, and aliphatic diisocyanate.

Usable aromatic diisocyanates include, for instance, m- or p-phenylene diisocyanate, 4,4'-diphenyl diisocyanate, 1,5-naphthalene diisocyanate (NDI), 4,4'-, 2,4'- or 2,2'-diphenyl methane diisocyanate (MDI), 2,4- or 2,6-tolylene diisocyanate (TDI), and 4,4'-diphenyl ether diisocyanate.

Usable araliphatic diisocyanates include, for instance, 1,3- or 1,4-xylylene diisocyanate (XDI), and 1,3- or 1,4-tetramethyl xylylene diisocyanate (TMXDI).

Usable alicyclic diisocyanates include, for instance, 1,4-cyclohexane diisocyanate, 1,3-cyclohexane diisocyanate, 3-isocyanate methyl-3,5,5-trimethyl cyclohexyl isocyanate (isophorone diisocyanate; IPDI), 4,4'-, 2,4'- or 2,2'-dicyclohexyl methane diisocyanate (hydrogenated MDI), methyl-2,4-cyclohexane diisocyanate, methyl-2,6-cyclohexane diisocyanate, and 1,3- or 1,4-bis(isocyanate methyl)cyclohexane (hydrogenated XDI).

Usable aliphatic diisocyanates include, for instance, trimethylene diisocyanate, tetramethylene diisocyanate, hexamethylene diisocyanate (HDI), pentamethylene diisocyanate, 1,2-propylene diisocyanate, 1,2-, 2,3- or 1,3-butylene diisocyanate, and 2,4,4- or 2,2,4-trimethyl hexamethylene diisocyanate.

These organic diisocyanates may be in a urethane-modified, allophanate-modified, urea-modified, biuret-modified, urethodione-modified, urethoimine-modified, isocyanurate-modified, or carbodiimide-modified form. These may be used singly or in combination.

The isocyanate compounds listed above may be partially condensed with a compound with a hydroxyl group or the like or may be in the form of various derivatives, and such compounds may be used singly or in combination. For instance, they may be partially condensed with a diol or the like selected from a wide range of low molecular weight diols and oligomers, or a tri- or more functional polyol.

Of these compounds with an isocyanate group, 1,3-xylene diisocyanate (XDI) with a skeleton structure as represented by the undermentioned structural formula (1) and its partial condensation products and/or 1,4-xylylene diisocyanate (XDI) with a skeleton structure as represented by the undermentioned structural formula (2) and its partial condensation products are preferable in view of the gas barrier properties of the gas barrier layer formed of the crosslinking reaction product from the base resin, which is composed mainly of a copolymer, and the curing agent. The three-dimensional structure of the crosslinking reaction product has a large effect on the gas barrier properties. To develop gas barrier properties, it is preferable to have a xylylene diisocyanate skeleton. The above compounds have a xylylene diisocyanate skeleton.

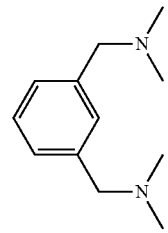

Structural formula (1)

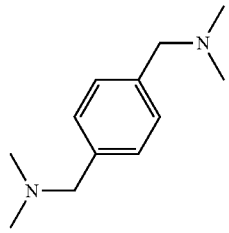

Structural formula (1)

a Compound, or Component (d1), with Either Two or More Carboxylic Acid Groups or One or More Carboxylic Acid Anhydride Groups For the invention, a compound (d1) with either two or more carboxylic acid groups or one or more carboxylic acid anhydride groups is preferably used as material to form the gas barrier layer. This ensures an increased contact strength between the deposited inorganic oxide layer and the gas barrier layer. The carboxyl group and the carboxylic acid anhydride group have a tendency to easily coordinate to the aluminum-oxygen bond and the silicon-oxygen bond existing in materials such as alumina and silica that constitute the inorganic oxide layer. If added to the resin composition to be applied to form the gas barrier layer, the compound with either two or more carboxylic acid groups or one or more carboxylic acid anhydride groups will coordinate to the inorganic oxide surface to make the surface organic, thereby improving the strength of contact with the resin composition. The existence of the compound with either two or more carboxylic acid groups or one or more carboxylic acid anhydride groups coordinating to the inorganic oxide surface also serves to prevent the decrease in the contact strength as the moisture in the atmosphere or the water in contact during hot water sterilization can infiltrate the deposited inorganic oxide layer less easily.

Such compounds (d1) with either two or more carboxylic acid groups or one or more carboxylic acid anhydride groups contained in one molecule include phthalic acid, terephthalic acid, isophthalic acid, sebacic acid, azelaic acid, adipic acid, trimellitic acid, 2,6-naphthalene dicarboxylic acid, maleic acid, succinic acid, malic acid, citric acid, isocitric acid, and tartaric acid.

Compounds containing an acid anhydride acid component include maleic anhydride, succinic anhydride, trimellitic anhydride, and tetrabasic anhydride, but when applied to a highly polarized base film such as metal, in particular, it is preferable to use a compound with two or more anhydride acid components such as tetrabasic anhydrides. Such tetrabasic anhydrides include benzophenone tetracarboxylic anhydride, 2,3,6,7-naphthalene tetracarboxylic dianhydride, and 5-(2,5-dioxotetrahydro-3-furanyl)-3-methyl-3-cyclohexene- 1,2-dicarboxylic anhydride. Of these, it is preferable to use 5-(2,5-dioxotetrahydro-3-furanyl)-3-methyl-3-cyclohexene-1,2-dicarboxylic anhydride. The compound (d1) preferably accounts for 0.1 to 20 parts by mass, more preferably 0.1 to 10 parts by mass from the viewpoint of long-term stability of the gas barrier layer, relative to 100 parts by mass of the total of the base resin, which is used to form the gas barrier layer, and the curing agent. If its quantity is 0.1 parts by mass or less, the compound with either two or more carboxylic acid groups or one or more carboxylic acid anhydride groups can coordinate less efficiently in many cases, failing to achieve an sufficient contact strength. If the quantity is more than 20 parts by mass, on the other hand, reactions involving substances other than the compound with either two or more carboxylic acid groups or one or more carboxylic acid anhydride groups will be inhibited undesirably, possibly leading to a coat film with poor gas barrier properties.

A compound produced by polymerizing said compound (d1) with either two or more carboxylic acid groups or one or more carboxylic acid anhydride groups contained in one molecule may be used.

This compound produced by polymerizing said compound (d1) with either two or more carboxylic acid groups or one or more carboxylic acid anhydride groups contained in one molecule preferably has a number average molecular weight of 1,000 or less.

Silane Coupling Agent (d2)

As an embodiment of this invention, it is also preferable to add a silane coupling agent (d2) to the coating liquid of said copolymer resin (base resin) composition. The silane coupling agent (d2) has an organic functional group and a hydrolysable functional group in one molecule and acts to increase the contact strength between the inorganic substance and the organic substance. Thus, the addition of the silane coupling agent (d2) serves to enhance the contact strength between the deposited inorganic oxide layer and the gas barrier layer to the extent that it can resist hot water sterilization.

It is preferable that the silane coupling agent (d2) to be added has at least one hydroxyl group. If containing at least one hydroxyl group, the silane coupling agent (d2) accelerates the crosslinking reaction between the hydroxyl group in the copolymer resin, i.e. the base resin, and the isocyanate group in the curing agent, and simultaneously forms hydrogen bonds with the hydroxyl group in the surface of the deposited inorganic oxide layer, acting to further increase the contact strength and achieve a stronger contact between the deposited inorganic oxide layer and the gas barrier layer.

To ensure a good contact against hot water sterilization, the silane coupling agent (d2) preferably has one or more functional groups selected from the group of amino, vinyl, and epoxy. Examples include 3-aminopropyl trimethoxysilane, 3-aminopropyl triethoxysilane, N-2-(aminoethyl)-3-aminopropyl methyl dimethoxy silane, N-2-(aminoethyl)-3-aminopropyl trimethoxysilane, N-2-(aminoethyl)-3-aminopropyl triethoxysilane, vinyl trichlorosilane, vinyl trimethoxysilane, vinyl triethoxysilane, γ-glycidoxy propyl trimethoxysilane, γ-glycidoxy propyl methyl diethoxy silane, and β-(3,4-epoxy cyclohexyl)ethyl trimethoxysilane. These silane coupling agents may be used singly or in the form of a mixture of two or more thereof.

The silane coupling agent (d2) preferably accounts for 0.1 to 10 parts by mass, more preferably 0.1 to 2 parts by mass from the viewpoint of long-term stability of the gas barrier layer, relative to 100 parts by mass of the total of the base resin, which is used to form the gas barrier layer, and the curing agent. If its quantity is 0.1 parts by mass or less, the silane coupling agent will not have a sufficient effect, failing to achieve a sufficient contact strength. If the quantity is more than 10 parts by mass, on the other hand, the coat film will have poor gas barrier properties as the silane coupling agent (d2) can work to plasticize the gas barrier layer.

Preparation of the Silane Coupling Agent

With respect to said silane coupling agent (d2), water and a solvent are mixed and hydrolyzed by a generally known technique to produce a silane coupling agent with at least one hydroxyl group such as, for instance, silanol, a compound in which a hydroxyl group is bonded to a silicon atom. Usable solvents include toluene, xylene, ethyl acetate, butyl acetate, acetone, methyl ethyl ketone, methyl isobutyl ketone, tetrahydrofuran, dimethyl formamide, dimethyl acetamide, methanol, and ethanol.

Production of the Gas Barrier Layer

An unsaturated nitrile (a) and an unsaturated compound (b) with a hydroxyl group as described above are mixed, and then a curing agent (c) of a compound that has an isocyanate group as described later is added, followed by copolymerization by a generally known technique to produce a copolymer. The copolymer is dissolved in a mixed solution of, for instance, propyl acetate, propylene glycol monomethyl ether, and n-propyl alcohol, and mixed with the above curing agent. Then, required quantities of said copolymer resin (base resin) solution and said curing agent are mixed and dissolved in a solvent to provide a coating liquid for gas barrier layer formation. Usable solvents include toluene, xylene, ethyl acetate, butyl acetate, acetone, methyl ethyl ketone, methyl isobutyl ketone, tetrahydrofuran, dimethyl formamide, dimethyl acetamide, methanol, ethanol, and water.

For the invention, there are no specific limitations on the compounding ratio between the base resin, which is to form the gas barrier layer, and the curing agent, but if the quantity of the curing agent is too small, its crosslinking reaction with the base resin will not proceed sufficiently, leading not only to inadequate curing of the coat film but also to an insufficient coat film strength, which will result in an insufficient resistance to hot water treatment and an insufficient contact with the base film. If the quantity of the curing agent is too large, not only blocking can be caused, but also the excess isocyanate compound can move into other layers, leading to inexpediences in post-processes.

There are no specific limitations on the method to produce the gas barrier layer of the invention, and an appropriate production method may be used to meet the base film. The coating liquid may be spread by, for instance, printing methods such as offset printing, gravure printing, and silk screen printing, and coating methods such as coating roll coating, dip coating, bar coating, die coating, knife edge coating, gravure coating, kiss coating, and spin coating, and combinations thereof.

The gas barrier layer formed on the deposited layer preferably has a thickness of 0.1 to 3 μm, more preferably 0.2 to 2 μm. If the thickness of the gas barrier layer is 0.1 μm or more, adequately improved gas barrier properties are achieved and the processability during coating is increased, making it possible to form a gas barrier layer free from defects such as film breakage and cissing. If the thickness of the gas barrier layer is 3 μm or less, furthermore, the solvent is sufficiently dried even under undesirable drying conditions during coating such as low temperature and short drying time, serving to avoid problems including film deformation, such as curling, and an increase in production cost.

In the gas barrier film of the invention, an overcoat layer may be formed on the gas barrier layer. The overcoat layer may be formed of, for instance, a plastic material such as polyethylene, straight-chain polyethylene, polypropylene, ethylene-vinyl acetate copolymer, ethylene-methacrylate copolymer, ethylene-methacrylate copolymer, ethylene-acrylate copolymer, ethylene-acrylate polymer, and metal crosslinked polymer thereof. Its thickness may be appropriately decided on, but commonly it is in the range of 15 to 200 μm.

With respect to the overcoat layer formation method, there are various generally known lamination methods including the dry lamination method in which a film of a plastic material as listed above is bonded using a two-component reaction curable adhesive, the nonsolvent lamination method that uses a solventless adhesive for bonding, and the extrusion lamination method in which a film of a plastic material as listed above is melted by heating and extruded into a curtain-like form, followed by bonding.

When the deposited layer is coated with a gas barrier layer and an overcoat layer to form a laminate structure for the invention, it is preferable that drying is carried out at a temperature of preferably 70° C. or more, more preferably 90° C. or more, depending on the solvent used in the coating liquid. If the drying temperature is low than 70° C., the coat film will not be dried sufficiently, making it difficult to form a film with sufficient gas barrier properties. An intermediate product may be wind up and aged to allow the crosslinking reaction between the base resin and the curing agent to progress sufficiently. The aging treatment serves to accelerate the crosslinking reaction to ensure an adequate coat film strength, gas barrier properties, and resistance to hot water treatment.

The gas barrier film of the invention can be used in various fields where gas barrier properties are required. In particular, it serves effectively as material for retort pouch packaging.

EXAMPLES

The present invention is illustrated in greater detail below with reference to Examples, but it should be understood that the invention is not construed as being limited thereto. In these Examples, the term "parts" refers to "parts by mass" unless otherwise specified.

Characteristics Evaluation Method

The characteristics of the gas barrier film were evaluated according to the evaluation methods described below.

(1) Haze

The haze of the gas barrier film samples prepared in Examples and Comparative examples was measured with a direct reading haze meter (HGM-20P, supplied by Suga Test Instruments Co., Ltd.) according to JIS K 7105 (1981). Three test pieces with a size of 50 mm×50 mm were cut out and their haze was observed. Five measurements were made for each test piece, and the average of a total of 15 measurements was used for evaluation.

(2) Oxygen Permeability

The oxygen permeability was measured under the conditions a temperature of 23° C. and a humidity of 0% RH using an oxygen permeability measuring apparatus (Ox-Tran (registered trademark) (OXTRAN2/20) supplied by Mocon, Inc., U.S.A.) by the B method (isobaric method) according to JIS K 7126 (2000). For each Example and Comparative example, two measurements were made for two test pieces and the average of the total of four measurements was used for oxygen permeability evaluation in each Example and Comparative example.

(3) Vapor Permeability

The vapor permeability was measured under the conditions a temperature of 40° C. and a humidity of 90% RH using a vapor permeability measuring apparatus (Permatran (registered trademark) W3/31 supplied by Mocon, Inc., U.S.A.) by the B method (infrared sensor method) according to JIS K7129 (2000). For each Example and Comparative example, two measurements were made for two test pieces and the average of the total of four measurements was used for vapor permeability evaluation in each Example and Comparative example.

(4) Contact Strength

A tensile testing machine (Tensilon Tester PTM-50, supplied by Orientec Co., Ltd.) was used for contact strength evaluation. Strip samples with a width of 15 mm and a length of 200 mm were cut out from laminate films prepared in each Example and Comparative example and used for evaluation. The base film of an evaluation sample was fixed to a film chuck of a tensile testing machine while the sealant film was fixed to the other chuck, and a T-peel test (peel interface angle 90°) was carried out by the tensile testing machine at a speed of 300 mm/min to measure the contact strength between the base film and the sealant film. For each Example and Comparative example, measurements were made for five samples, and their average was used for contact strength evaluation.

(5) Retort Resistance Evaluation

In each Example and Comparative example, two laminated film samples (15 cm×15 cm) were prepared. The two laminated film samples were superposed with their sealant film faces facing each other, and their three edges were heat-sealed using a heat sealer. Then, 100 g of water was put in as the content, and the remaining edge was heat-sealed to prepare a 15 cm×15 cm package. One package was prepared in each Example and Comparative example. Then, the package was subjected to retort treatment (120° C., 30 minutes) in a SR-240 autoclave supplied by Tomy Seiko Co., Ltd. After the treatment, the package was open and the water was removed, followed by measuring the contact strength between the gas barrier film and the sealant film by the above method using a tensile testing machine to provide a value for contact strength evaluation. Also, a test specimen was dried overnight at room temperature after the retort treatment and removal of the water contents, followed by measuring its oxygen permeability and vapor permeability by the above-mentioned methods to provide values representing the barrier properties after retort treatment.

Production of Copolymer

For the copolymers to be used for Examples and Comparative examples given below, the monomers of acrylonitrile (AN), 2-hydroxyethyl methacrylate (2-HEMA) and methyl methacrylate (MMA) were mixed according to the proportions (mass %) given in Table 1, and copolymerized by a generally known technique. The resulting copolymer resins were dissolved in a mixed solvent of propyl acetate, propylene glycol monomethyl ether, and n-propyl alcohol to produce copolymer resins a to m with a solid content of 30 mass %. The monomer mixing ratios for the copolymer resins and the appearance of the resulting paints are described in Table 1.

TABLE 1

| | Monomer copolymerization ratio (parts by mass relative to entire copolymer) | | | |
|---|---|---|---|---|
| Copolymer resin | Monomer (a) AN | Monomer (b) 2-HEMA | Monomer (e) MMA | Paint appearance |
| a | 20 | 40 | 40 | transparent |
| b | 20 | 50 | 30 | transparent |
| c | 25 | 50 | 25 | transparent |
| d | 30 | 50 | 20 | transparent |
| e | 10 | 60 | 30 | transparent |

TABLE 1-continued

| | Monomer copolymerization ratio (parts by mass relative to entire copolymer) | | | |
|---|---|---|---|---|
| Copolymer resin | Monomer (a) AN | Monomer (b) 2-HEMA | Monomer (e) MMA | Paint appearance |
| f | 20 | 70 | 10 | slightly suspended |
| g | 30 | 70 | 0 | slightly suspended |
| h | 0 | 20 | 80 | transparent |
| i | 0 | 40 | 60 | transparent |
| j | 10 | 20 | 70 | transparent |
| k | 20 | 20 | 60 | transparent |
| l | 35 | 40 | 25 | clouded |
| m | 35 | 60 | 5 | clouded |

AN: acrylonitrile
2-HEMA: 2-hydroxyethyl methacrylate
MMA: methyl methacrylate

Example 1

Deposited Film (Inorganic Compound Deposited on a Base Film)

Barrialox (registered trademark) 1011HG supplied by Toray Advanced Film Co., Ltd., which consists of an aluminum oxide layer deposited on one side of a biaxially stretched polyethylene terephthalate film, was used as deposited film composed of a base film and a deposited layer.
(Coating Liquid)
A mixture of 10.0 parts of a copolymer resin, 4.9 parts of a HX-75 curing agent composed primarily of xylene diisocyanate supplied by DIC Corporation, 25.4 parts of methyl ethyl ketone, and 3.0 parts of a 5-(2,5-dioxotetrahydro-3-furanyl)-3-methyl-3-cyclohexene-1,2-dicarboxylic anhydride dilute for methyl ethyl ketone (10 mass %) was stirred for 30 minutes to provide a gas barrier layer coating liquid 1 with a solid content of 15 mass %.
(Production of Gas Barrier Layer)
On the aluminum oxide layer of said deposited film, the coating liquid 1 was spread with a wire bar, followed by drying at 140° C. for 30 seconds to produce a gas barrier layer to have a weight of 0.9 g/m² when dried. A gas barrier film 1 was produced in this way.
(Production of Overcoat Layer)
A mixture of 20 parts of AD-503 adhesive for dry lamination supplied by Toyo-Morton, Ltd., 1 part of a CAT-10 curing agent supplied by Toyo-Morton, Ltd., and 20 parts of ethyl acetate was weighed out and stirred for 30 minutes to prepare an adhesive solution for dry lamination with a solid content of 19 mass %.

This adhesive solution was spread with a wire bar on the overcoat surface of the gas barrier film 1 and dried at 80° C. for 45 seconds to form a 3.5 μm adhesive layer.
Then, this adhesive layer was put on a ZK93K unstretched polypropylene film supplied by Toray Advanced Film Co., Ltd. to be used as sealant film, with the adhesive layer and the corona treated surface facing each other, followed by pressing them together with a hand roller. The resulting laminated film was aged for two days in an oven heated at 40° C. to provide a laminated film 1.

Example 2

A mixture of 10.0 parts of the copolymer resin b, 2.5 parts of a Dicdry X-75 isocyanate-based curing agent supplied by DIC Corporation, and 20.1 parts of methyl ethyl ketone was stirred for 30 minutes to prepare a coating liquid 2 for gas barrier layer formation with a solid content of 15 mass %. Except for the use of this coating liquid 2 to form a gas barrier layer, the same procedure as in Example 1 was carried out to provide a gas barrier film 2 and a laminated film 2.

Example 3

A mixture of 10.0 parts of the copolymer resin c, 2.5 parts of a Dicdry X-75 isocyanate-based curing agent supplied by DIC Corporation, and 20.1 parts of methyl ethyl ketone was stirred for 30 minutes to prepare a coating liquid 3 for gas barrier layer formation with a solid content of 15 mass %. Except for the use of this coating liquid 3 to form a gas barrier layer, the same procedure as in Example 1 was carried out to provide a gas barrier film 3 and a laminated film 4.

Example 4

A mixture of 10.0 parts of the copolymer resin d, 2.5 parts of a Dicdry X-75 isocyanate-based curing agent supplied by DIC Corporation, and 25.5 parts of methyl ethyl ketone was stirred for 30 minutes to prepare a coating liquid 4 for gas barrier layer formation with a solid content of 15 mass %. Except for the use of this coating liquid 4 to form a gas barrier layer, the same procedure as in Example 1 was carried out to provide a gas barrier film 4 and a laminated film 4.

Example 5

A mixture of 10.0 parts of the copolymer resin e, 2.5 parts of a Dicdry X-75 isocyanate-based curing agent supplied by DIC Corporation, and 25.5 parts of methyl ethyl ketone was stirred for 30 minutes to prepare a coating liquid 5 for gas barrier layer formation with a solid content of 15 mass %. Except for the use of this coating liquid 5 to form a gas barrier layer, the same procedure as in Example 1 was carried out to provide a gas barrier film 5 and a laminated film 5.

Example 6

A mixture of 10.0 parts of the copolymer resin f, 2.5 parts of a Dicdry X-75 isocyanate-based curing agent supplied by DIC Corporation, and 25.5 parts of methyl ethyl ketone was stirred for 30 minutes to prepare a coating liquid 6 for gas barrier layer formation with a solid content of 15 mass %. Except for the use of this coating liquid 6 to form a gas barrier layer, the same procedure as in Example 1 was carried out to provide a gas barrier film 6 and a laminated film 6.

Example 7

A mixture of 10.0 parts of the copolymer resin g, 2.5 parts of a Dicdry X-75 isocyanate-based curing agent supplied by DIC Corporation, and 25.5 parts of methyl ethyl ketone was stirred for 30 minutes to prepare a coating liquid 7 for gas barrier layer formation with a solid content of 15 mass %. Except for the use of this coating liquid 7 to form a gas barrier layer, the same procedure as in Example 1 was carried out to provide a gas barrier film 7 and a laminated film 7.

Example 8

A mixture of 3.8 parts of a KBE-903 silane coupling agent (3-aminopropyl triethoxysilane) supplied by Shin-Etsu Chemical Co., Ltd., 0.9 part of pure water, and 20.3 parts of acetone was stirred with a stirrer for 120 minutes for hydrolysis to prepare a silane coupling agent a with a solid content of 15 mass %. Then, a mixture of 10.0 parts of the copolymer resin b, 2.5 parts of a Dicdry X-75 isocyanate-based curing agent supplied by DIC Corporation, 19.0 parts of methyl ethyl ketone, and 1.63 parts of the silane coupling agent a was stirred for 30 minutes to prepare a coating liquid 8 for gas barrier layer formation with a solid content of 15 mass %. Except for the use of this coating liquid 8 to form a gas barrier layer, the same procedure as in Example 1 was carried out to provide a gas barrier film 8 and a laminated film 8.

Example 9

Except for the use of an increased amount of 2.60 parts of the silane coupling agent a, the same procedure as in Example 8 was carried out to prepare a coating liquid 9 for gas barrier layer formation with a solid content of 15 mass %. Except for the use of this coating liquid 9 to form a gas barrier layer, the same procedure as in Example 1 was carried out to provide a gas barrier film 9 and a laminated film 9.

Example 10

Except for the use of an increased amount of 7.30 parts of a methyl ethyl ketone solution with a 10 mass % concentration of a compound with a carboxylic acid anhydride group, the same procedure as in Example 1 was carried out to prepare a coating liquid 10 for gas barrier layer formation with a solid content of 15 mass %. Except for the use of this coating liquid 10 to form a gas barrier layer, the same procedure as in Example 1 was carried out to provide a gas barrier film 10 and a laminated film 10.

Comparative Example 1

Except that no gas barrier coated layer was formed on the deposited layer on Barrialox (registered trademark) 1011HG supplied by Toray Advanced Film Co., Ltd. (this being referred to as gas barrier film 11), the same procedure as in Example 1 was carried out to form an overcoat layer to provide a laminated film 11.

Comparative Example 2

A mixture of 10.0 parts of the copolymer resin h, 2.5 parts of a Dicdry X-75 isocyanate-based curing agent supplied by DIC Corporation, and 25.5 parts of methyl ethyl ketone was stirred for 30 minutes to prepare a coating liquid 11 for gas barrier layer formation with a solid content of 15 mass %. Except for the use of this coating liquid 11 to form a gas barrier layer, the same procedure as in Example 1 was carried out to provide a gas barrier film 12 and a laminated film 12.

Comparative Example 3

A mixture of 10.0 parts of the copolymer resin i, 2.5 parts of a Dicdry X-75 isocyanate-based curing agent supplied by DIC Corporation, and 25.5 parts of methyl ethyl ketone was stirred for 30 minutes to prepare a coating liquid 12 for gas barrier layer formation with a solid content of 15 mass %. Except for the use of this coating liquid 12 to form a gas barrier layer, the same procedure as in Example 1 was carried out to provide a gas barrier film 13 and a laminated film 13.

Comparative Example 4

A mixture of 10.0 parts of the copolymer resin j, 2.5 parts of a Dicdry X-75 isocyanate-based curing agent supplied by DIC Corporation, and 25.5 parts of methyl ethyl ketone was stirred for 30 minutes to prepare a coating liquid 13 for gas barrier layer formation with a solid content of 15 mass %. Except for the use of this coating liquid 13 to form a gas barrier layer, the same procedure as in Example 1 was carried out to provide a gas barrier film 14 and a laminated film 14.

Comparative Example 5

A mixture of 10.0 parts of the copolymer resin k, 2.5 parts of a Dicdry X-75 isocyanate-based curing agent supplied by DIC Corporation, and 25.5 parts of methyl ethyl ketone was stirred for 30 minutes to prepare a coating liquid 14 for gas barrier layer formation with a solid content of 15 mass %. Except for the use of this coating liquid 14 to form a gas barrier layer, the same procedure as in Example 1 was carried out to provide a gas barrier film 15 and a laminated film 15.

Comparative Example 6

A mixture of 10.0 parts of the copolymer resin l, 2.5 parts of a Dicdry X-75 isocyanate-based curing agent supplied by DIC Corporation, and 25.5 parts of methyl ethyl ketone was stirred for 30 minutes to prepare a coating liquid 15 for gas barrier layer formation with a solid content of 15 mass %. Except for the use of this coating liquid 15 to form a gas barrier layer, the same procedure as in Example 1 was carried out to provide a gas barrier film 16 and a laminated film 16.

Comparative Example 7

A mixture of 10.0 parts of the copolymer resin l, 2.5 parts of a Dicdry X-75 isocyanate-based curing agent supplied by DIC Corporation, and 25.5 parts of methyl ethyl ketone was stirred for 30 minutes to prepare a coating liquid 16 for gas barrier layer formation with a solid content of 15 mass %. Except for the use of this coating liquid 16 to form a gas barrier layer, the same procedure as in Example 1 was carried out to provide a gas barrier film 17 and a laminated film 17.

Comparative Example 8

Except that the methyl ethyl ketone solution with a 10 mass % concentration of a compound with a carboxylic acid anhydride group was not used, the same procedure as in Example 1 was carried out to provide a gas barrier film 18 and a laminated film 18.

For the gas barrier films and the laminated films prepared in Examples 1 to 8 and Comparative examples 1 to 8, the above-mentioned evaluation methods were carried out to evaluate their characteristics. Results are shown in Table 2. Constitutional features of the gas barrier films and laminated films prepared in Examples 1 to 8 and Comparative examples 1 to 7 are also included in Table 2.

TABLE 2

| | | Constitution | | | | | | |
|---|---|---|---|---|---|---|---|---|
| | | | Coat layer | | | | | |
| | Base film | Inorganic compound layer | Base material | Component (c) curing agent | Component (d1) [parts by mass] | Component (d2) [parts by mass] | [g/m²] | Haze |
| Example 1 | PET(12 μm) | AlOx | a | XDI-type isocyanate | 3.0 | 0 | 0.9 | 2.2 |
| Example 2 | PET(12 μm) | AlOx | b | XDI-type isocyanate | 3.0 | 0 | 0.9 | 2.1 |
| Example 3 | PET(12 μm) | AlOx | c | XDI-type isocyanate | 3.0 | 0 | 0.9 | 2.2 |
| Example 4 | PET(12 μm) | AlOx | d | XDI-type isocyanate | 3.0 | 0 | 0.9 | 2.2 |
| Example 5 | PET(12 μm) | AlOx | e | XDI-type isocyanate | 3.0 | 0 | 0.9 | 2.1 |
| Example 6 | PET(12 μm) | AlOx | f | XDI-type isocyanate | 3.0 | 0 | 0.9 | 2.5 |
| Example 7 | PET(12 μm) | AlOx | g | XDI-type isocyanate | 3.0 | 0 | 0.9 | 2.6 |
| Example 8 | PET(12 μm) | AlOx | b | XDI-type isocyanate | 3.0 | 1.6 | 0.9 | 2.2 |
| Example 9 | PET(12 μm) | AlOx | b | XDI-type isocyanate | 3.0 | 2.6 | 0.9 | 2.1 |
| Example 10 | PET(12 μm) | AlOx | a | XDI-type isocyanate | 7.3 | 0 | 0.9 | 2.2 |
| Comparative example 1 | PET(12 μm) | AlOx | — | — | — | — | — | 3.1 |
| Comparative example 2 | PET(12 μm) | AlOx | h | XDI-type isocyanate | 3.0 | 0 | 0.9 | 2.2 |
| Comparative example 3 | PET(12 μm) | AlOx | i | XDI-type isocyanate | 3.0 | 0 | 0.9 | 2.1 |
| Comparative example 4 | PET(12 μm) | AlOx | j | XDI-type isocyanate | 3.0 | 0 | 0.9 | 2.2 |
| Comparative example 5 | PET(12 μm) | AlOx | k | XDI-type isocyanate | 3.0 | 0 | 0.9 | 2.1 |
| Comparative example 6 | PET(12 μm) | AlOx | l | XDI-type isocyanate | 3.0 | 0 | 0.9 | 5.3 |
| Comparative example 7 | PET(12 μm) | AlOx | m | XDI-type isocyanate | 3.0 | 0 | 0.9 | 6.2 |
| Comparative example 8 | PET(12 μm) | AlOx | b | XDI-type isocyanate | 0 | 0 | 0.9 | 2.1 |

| | Untreated barrier properties | | Barrier properties after retort treatment | | Contact strength after retort treatment [g/15 mm] |
|---|---|---|---|---|---|
| | O₂TR (90% RH) | MVTR (90% RH) | O₂TR (90% RH) | MVTR (90% RH) | |
| Example 1 | 0.38 | 0.50 | 0.40 | 1.21 | 340 |
| Example 2 | 0.26 | 0.34 | 0.29 | 0.85 | 350 |
| Example 3 | 0.25 | 0.32 | 0.31 | 0.91 | 320 |
| Example 4 | 0.26 | 0.35 | 0.28 | 0.87 | 300 |
| Example 5 | 0.36 | 0.46 | 0.38 | 0.98 | 340 |
| Example 6 | 0.21 | 0.32 | 0.42 | 1.02 | 330 |
| Example 7 | 0.20 | 0.38 | 0.35 | 1.05 | 370 |
| Example 8 | 0.25 | 0.35 | 0.31 | 0.85 | 390 |
| Example 9 | 0.30 | 0.42 | 0.40 | 1.05 | 400 |
| Example 10 | 0.40 | 0.51 | 0.41 | 1.22 | 350 |
| Comparative example 1 | 1.01 | 1.03 | 2.86 | 2.13 | 400 |
| Comparative example 2 | 0.69 | 0.73 | 0.87 | 1.22 | 330 |
| Comparative example 3 | 0.65 | 0.70 | 0.64 | 1.30 | 330 |
| Comparative example 4 | 0.65 | 0.69 | 0.82 | 1.19 | 320 |
| Comparative example 5 | 0.62 | 0.66 | 0.79 | 1.32 | 350 |
| Comparative example 6 | 0.28 | 0.45 | 0.66 | 1.24 | 170 |

TABLE 2-continued

| | | | | | |
|---|---|---|---|---|---|
| Comparative example 7 | 0.25 | 0.53 | 0.72 | 1.35 | 190 |
| Comparative example 8 | 0.33 | 0.37 | 0.82 | 1.29 | 120 |

XDI: 1,3-xylylene diisocyanate

Comparison Between Examples 1 to 8 and Comparative Example 1

As compared with the film in Comparative example 1 that has no gas barrier layer on the deposited layer, all the gas barrier films 1 to 8 and laminated films 1 to 8 in Examples 1 to 8 are improved in terms of gas barrier properties ($O_2TR$) and vapor permeability (MVTR) in both untreated and retort-treated cases. The laminated films 1 to 8 that has a gas barrier layer of a specific resin composition, in particular, maintain very good oxygen barrier properties after retort treatment.

Comparison Between Examples 1 to 8 and Comparative Examples 2 to 5

With respect to the resin compositions for gas barrier layer formation, the copolymer resins h and used in Comparative examples 2 and 3 do not contain an acrylonitrile component that can contribute largely to the gas barrier properties of the coat film. In the copolymer resins j and k used in Comparative examples 4 and 5, 2-hydroxyethyl methacrylate, which is an unsaturated compound with a hydroxyl group that contributes largely to the gas barrier properties of the coat film, accounts for only 20 mass %. Accordingly, the gas barrier properties of the gas barrier films 9 to 12 in Comparative examples 2 to 5 are not improved significantly or are improved only little as compared with the gas barrier films 1 to 8 in Examples 1 to 8. It is seen that in order to develop good gas barrier properties, the copolymer should contain unsaturated nitrile (acrylonitrile) up to a specific content and in addition, the content of the unsaturated compounds with a hydroxyl group (2-hydroxyethyl methacrylate) should be increased.

Comparison Between Examples 1 to 8 and Comparative Examples 6 and 7

With respect to the resin composition for gas barrier layer formation, the copolymer resins l and m used in Comparative examples 6 and 7 contain the acrylonitrile component, as unsaturated nitrile, up to 35 mass %. Accordingly, the copolymer deteriorated in solubility, and the paint was suspended. The gas barrier layers formed from the copolymer resins l or m that had properties as described above were very hazy and were not sufficiently practical as packaging material. It was also found that a largely increased content of unsaturated nitrile (acrylonitrile) as a copolymer component will cause a transparency problem, and therefore, unsaturated nitrile (acrylonitrile monomer) should be contained up to a specific content to develop good gas barrier properties.

Comparison Between Example 2 and Comparative Examples 8

With respect to the resin composition for gas barrier layer formation, the resin composition used in Example 2 and that used in Comparative example 8 are identical in terms of the content of the copolymer resin composition, but a compound with a carboxylic acid anhydride group is added in Example 2 while such a compound is not used in Comparative example 8. As a result, in the laminated film 15 in Comparative example 8, water infiltrates in the neighborhood of the interface between the deposited inorganic oxide layer and the gas barrier layer during retort treatment (high temperature hot water treatment), resulting in a decreased contact strength at the interface. Consequently, the dry laminate strength between the sealant film and the gas barrier film is decreased by retort treatment in Comparative examples 8, and in serious cases, the package filled with foods can be delaminated during the hot water sterilization process, or even breakage of the package may take place.

Comparison Between Examples 1 to 5 and Examples 6 and 7

With respect to the resin composition for gas barrier layer formation, the acrylonitrile component, used as unsaturated nitrile, accounts for 60 mass % or less of the copolymer resin in Examples 1 to 5, while in Examples 6 and 7, the acrylonitrile component accounts for 70 mass % of the resin. Therefore, the copolymer resin tends to be less soluble in the solvent, and the paint will be a slightly suspended state, making the gas barrier film to become slightly less transparent (become hazy) though free from practical problems. With respect to the comparison between Examples 1 to 6 and Example 7, the resin in Example 7 is a copolymer resin component that does not contain the unsaturated carboxylate (e), and no flexible portion is contained in the polymer structure. In addition, the degree of crosslinking is high, and the acrylonitrile component accounts for a large part, leading to a coat film with a high hardness. Accordingly, as compared with Examples 1 to 6, the gas barrier layer cannot deform or relax smoothly in coordination with the shrinkage, expansion, or stress during retort treatment, resulting in a relatively large deterioration in oxygen barrier properties.

It is clearly seen from the results in Examples and Comparative examples that the gas barrier film provided by the invention has high transparency, good barrier properties against both oxygen and vapor, and high retort resistance.

Comparison Between Examples 1 to 7 and Examples 8 and 9

With respect to the resin composition for gas barrier layer formation, the resins in Examples 1 to 7 do not contain a silane coupling agent resin, while it is contained in the resin in Example 8. As a result, in Example 8, both an amino group, which is an organic functional group, and an ethoxy group, which is a hydrolysable functional group, are contained in one molecule of the KBE-903 silane coupling agent (3-aminopropyl triethoxysilane), leading to an improved contact strength between the aluminum oxide layer, which is inorganic, and the gas barrier layer, which is organic. In Example 8, furthermore, a hydrolyzed silane coupling agent is contained, and consequently, the hydroxyl group in the silane coupling agent and the hydroxyl group on the deposited inorganic oxide layer surface form a hydrogen bond, leading to a higher contact strength between the deposited inorganic oxide layer and the gas barrier layer during hot water sterilization as compared with Examples 1 to 7 in which no silane coupling agent is contained.

The gas barrier film provided by the invention not only has good oxygen barrier properties and vapor barrier properties, but also has resistance against hot water sterilization such as boiling and retorting. Specifically, the invention provides gas barrier films that serve for a wide range of uses including food packaging films that require gas barrier properties and undergo boiling and retorting processes.

The invention claimed is:

1. A gas barrier film comprising a base film of polyester provided, on at least one of its surfaces, with a deposited layer of an inorganic compound and a gas barrier layer of a copolymer resin composition formed on the former deposited layer,
   wherein said gas barrier layer is produced from a mixture of a base material composed of an unsaturated nitrile (a) that accounts for 10 to 30 parts by mass in 100 parts by mass of the copolymer and an unsaturated compound (b) with a hydroxyl group that accounts for 30 to 70 parts by mass in 100 parts by mass of the copolymer; a curing agent (c) that contains a compound with an isocyanate group; and a compound (d1) that has either two or more carboxylic acid groups or one or more carboxylic anhydride groups;
   wherein said compound (d1) with either two or more carboxylic acid groups or one or more carboxylic anhydride groups is tetrabasic anhydride.

2. A gas barrier film as claimed in claim 1 wherein said unsaturated nitrile (a) is acrylonitrile.

3. A gas barrier film as claimed in claim 1 wherein said unsaturated compound (b) with a hydroxyl group is 2-hydroxyethyl methacrylate.

4. A gas barrier film as claimed in claim 1 wherein said curing agent (c) containing a compound with an isocyanate group is an isocyanate with a backbone structure as represented by the following structural formula (1) and/or structural formula (2):

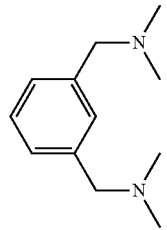

Structural formula (1)

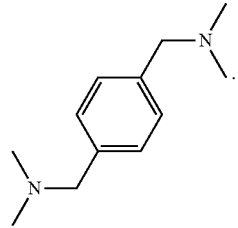

Structural formula (2)

5. A gas barrier film as claimed in claim 1 wherein said base material constituting said gas barrier layer contains, as monomers, one or more unsaturated compounds (e) selected from the group of unsaturated carboxylate, styrene, unsaturated carboxylic acid, unsaturated hydrocarbon, and vinyl ester that account for 3 to 60 parts by mass in 100 parts by mass of the copolymer.

6. A gas barrier film as claimed in claim 5 wherein said unsaturated compound (e) is methyl methacrylate.

7. A gas barrier film as claimed in claim 1 wherein said gas barrier layer contains a silane coupling agent (d2).

8. A gas barrier film as claimed in claim 7 wherein said silane coupling agent (d2) contains at least one hydroxyl group.

9. A gas barrier film as claimed in claim 7 wherein said silane coupling agent (d2) has one or more epoxy functional groups.

10. A packaging material for retort pouches comprising a gas barrier film as claimed in claim 1.

* * * * *